Aug. 13, 1963    B. I. ULINSKI    3,100,548
STEERING CONTROLLER FOR INDUSTRIAL TRUCK
Filed July 11. 1960    3 Sheets-Sheet 1
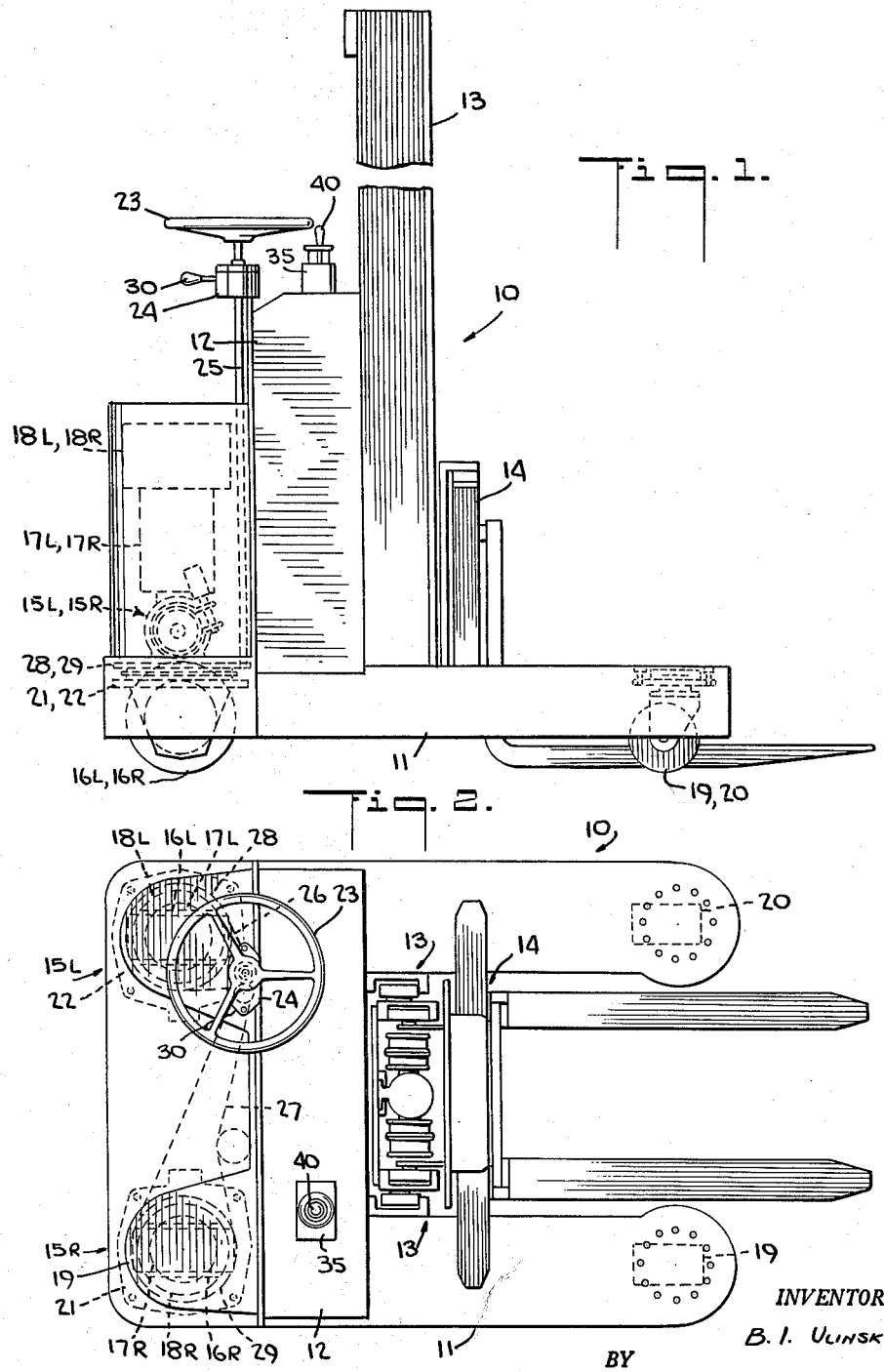
INVENTOR.
B. I. ULINSKI
BY
ATTORNEY

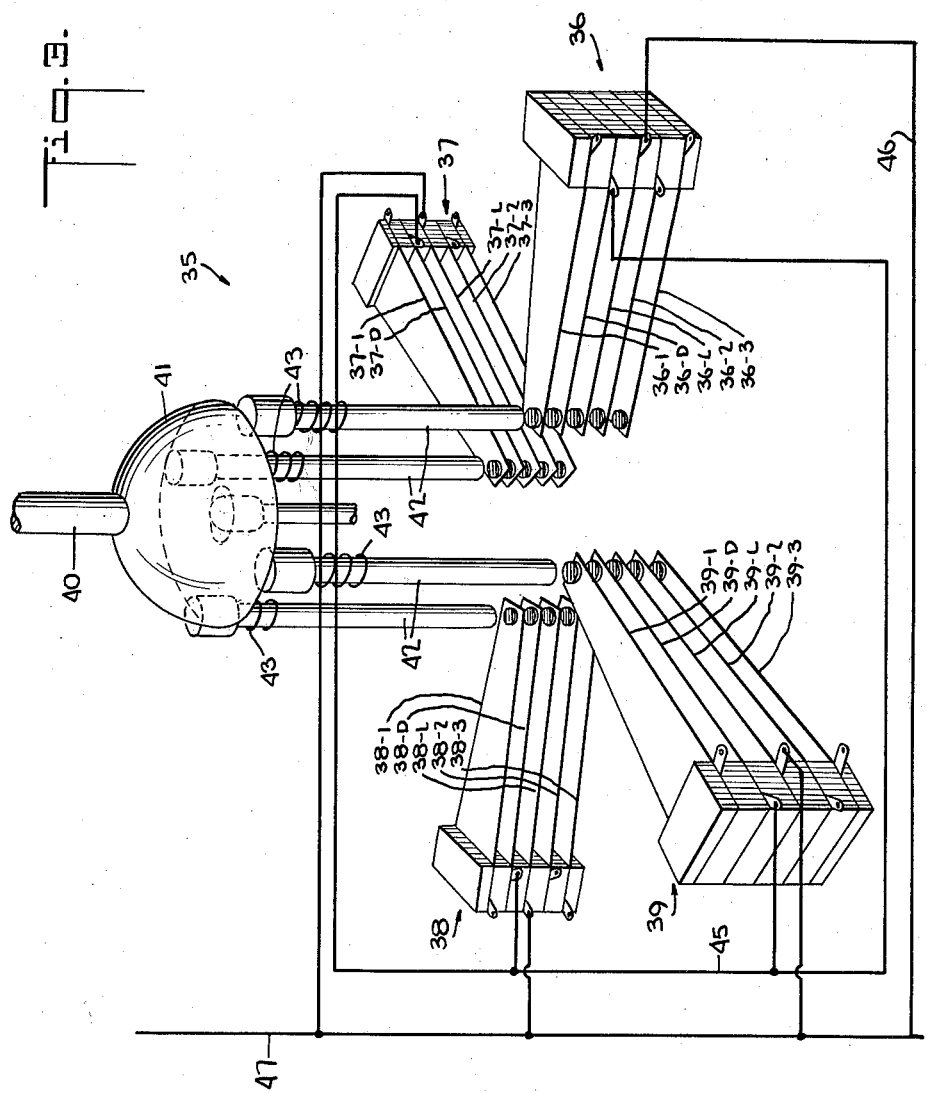

INVENTOR.
B. I. ULINSKI

United States Patent Office 3,100,548
Patented Aug. 13, 1963

3,100,548
STEERING CONTROLLER FOR INDUSTRIAL TRUCK
Bronislaus I. Ulinski, Flossmoor, Ill., assignor to The Yale & Towne Manufacturing Company, Stamford, Conn., a corporation of Connecticut
Filed July 11, 1960, Ser. No. 41,923
4 Claims. (Cl. 180—6.5)

This invention relates to a controller for an industrial truck that is equipped with a pair of traction units, each unit having a traction motor and a traction wheel driven by the motor.

My novel controller is particularly adapted for use on an industrial truck like that shown in my application Serial No. 829,111, filed July 23, 1959, now Patent No. 3,031,024, issued April 24, 1962. In that truck, the two traction motors are controlled individually so as to drive the traction wheels at the same speed or at different speeds in the same direction or in opposed directions. By driving either traction wheel faster than the other, the truck can be steered toward either side of its longitudinal axis. Extremely sharp steering may be effected by driving one traction wheel in one direction and the other traction wheel in an opposed direction. It is also possible to steer that truck directly sidewise by rotating the traction units so as to place the wheels in transverse steering positions, the motors then being controlled to drive the wheels in a particular manner.

It will be appreciated that the truck of my earlier application will operate when using conventional controller means. It is merely necessary to choose controller means that will enable the truck driver to operate each traction motor individually, so as to drive the wheels either at the same speeds or at differentiating speeds relatively to each other, in either the same or opposed directions. The novel controller of my present application is an important contribution, since it will facilitate to a considerable extent the driving control of the traction wheels, and will allow the truck driver to have better control over the movements of the truck.

As an important feature of my invention, I equip my controller with a separate portion for controlling each traction motor, but with means common to those portions for exciting both motors precisely in simultaneous relation to each other. The common means will act automatically when both traction wheels are to be driven at the same speed. That will enable the truck driver very easily to effect direct forward and rearward movements of the truck, without taking unusual care in the operation of the controller. He also will have better control when he wishes to effect those movements that are achieved through the driving of the wheels in opposed directions, but at the same speed. Nevertheless, my controller will allow the driver to control very well the operation of the wheels at different speeds, when he so desires.

I prefer to utilize in my novel controller a construction quite similar to that shown in my co-pending application entitled Drive Steering for Industrial Truck, Serial No. 27,589, filed May 9, 1960, now Patent No. 3,040,827, issued June 26, 1962. Thus, I prefer to equip my controller with four series of spring contacts, comprising four controller portions each adapted to control the driving of one of the two traction motors in one direction. There is a manually operated handle that will actuate any one, or combinations of two of the controller portions, depending on the manner in which the handle is moved. When actuated, each series of contacts is adapted to close in succession a series of circuits for controlling the speed of a particular motor in one direction.

In the invention of my present application, I arrange each of the first speed contacts to move against a contact that does not form a part of a particular circuit, and that I shall term a dead contact. I connect the dead contact in each of the four series of contacts in common with the dead contacts of the other series. When the truck driver wishes to operate two of the traction motors, he will move the controller handle to actuate the two appropriate controller portions, moving their first speed contacts toward a circuit closing position. Because of their arrangement, however, those first speed contacts will first move against the two corresponding dead contacts, thus being connected in common. The controller is now preconditioned for the closing of particular circuits, but those circuits are not actually closed. Further movement of the handle will move the two first speed contacts further toward circuit closing position. Then, should one of those contacts actually close its circuit before the other, the common connection will automatically effect the simultaneous closing of a circuit through the other contact.

Thereby both traction motors will be excited simultaneously. That will be true despite the fact that one of the actuated controller portions may not have moved fully to circuit closing position, due perhaps to some inaccuracy in the controller, or because the truck driver may not have moved the controller handle to exactly the correct position. While particularly adapted to excite the motors simultaneously, my controller nevertheless will allow selective operation of the four controller portions, so that the driver can operate the traction motors at different speeds and in opposed directions in order to maneuver the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 shows an industrial truck that utilizes my invention,

FIG. 2 shows a plan view of the truck,

FIG. 3 shows operating parts of my novel controller,

Figure 4:
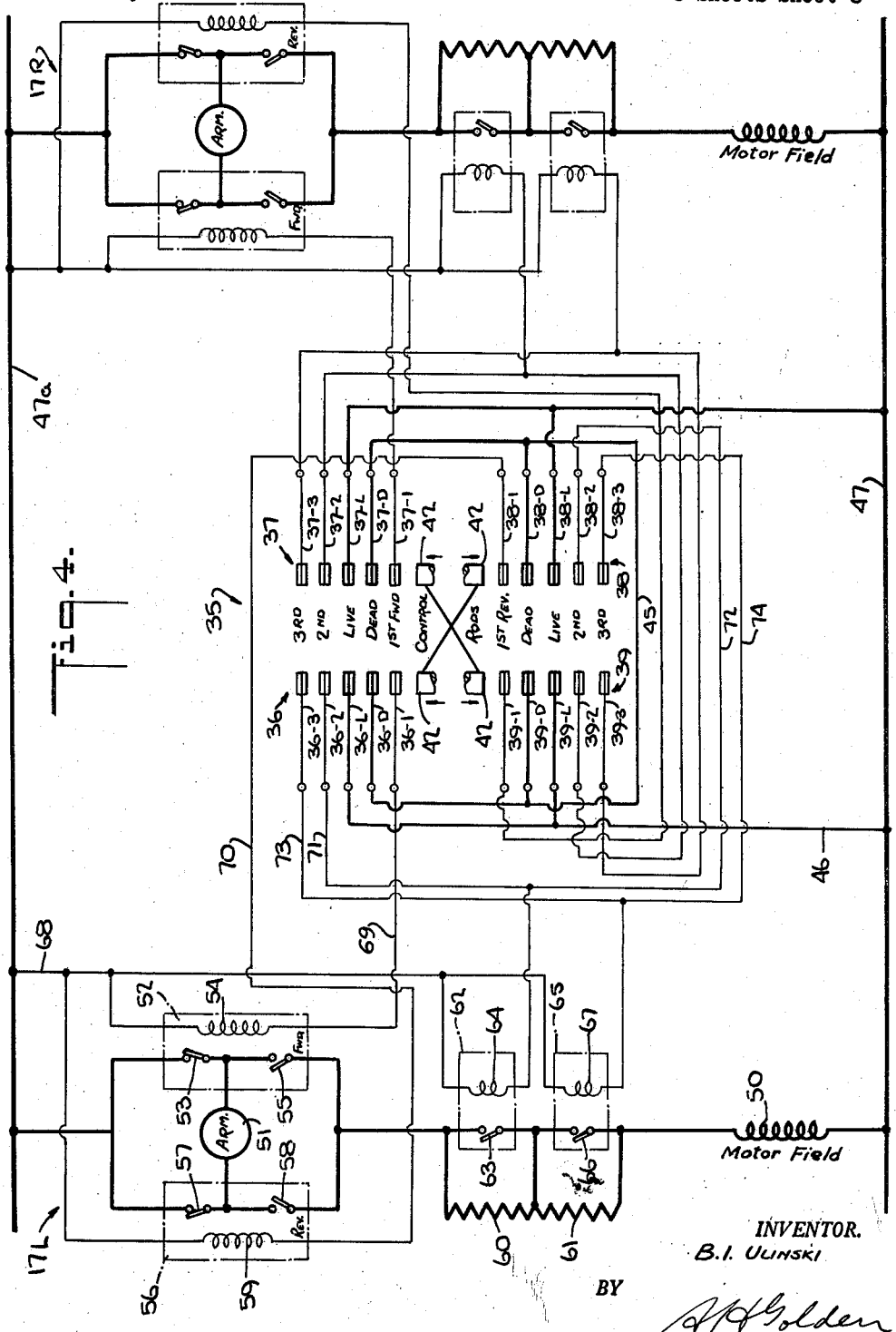
FIG. 4 is a circuit diagram showing how my controller is related to the motor circuits of the truck.

For the purpose of describing my invention, I show in FIGS. 1 and 2 an industrial truck 10 like that shown in my application Serial No. 27,589 to which I have already referred. Thus, the truck 10 has a main frame 11 that supports a rather usual battery compartment 12, and uprights 13 on which moves a load carriage 14. The rear end of the truck frame 11 is equipped with a pair of individually powered steering and traction units, shown in dotted lines in FIGS. 1 and 2, and comprising a left-hand unit 15L and a right-hand unit 15R that have corresponding steering and traction wheels 16L, 16R, and traction motors 17L, 17R, for driving those wheels. On each unit 15L, 15R is a compartment 18L or 18R for circuit control contactors and resistors that I shall describe in due course. The front end of truck frame 11 has a pair of casters 19, 20 that will steer freely as the truck moves.

The truck 10 will be steered by differentiating the drive of the traction wheels 16L, 16R, that being done through individual control of each motor 17L, 17R. A further type of steering can be effected by rotating the steering and traction units 15L, 15R on individual bearing assemblies 21, 22 relatively to truck frame 11. That type of steering is not of great importance to an understanding of my invention, but for purposes of disclosure I shall state that the truck driver can rotate a steering wheel 23 which will act through gears in a casing 24 to rotate a pair of shafts 25 in opposed directions, one of those shafts 25 being seen in FIG. 1. The shafts 25 will act through corresponding chains 26, 27 engaged with sprockets 28, 29 on the steering and traction units 15L, 15R, as shown in dotted lines in FIG. 1, whereby to rotate those units. The arrangement is such that the steering wheel 23 can rotate the units 15L, 15R in opposed directions so as to face their wheels transversely of the truck, thus steering the truck directly sidewise. The gear casing 24 is shown equipped with a handle 30 that can be moved to lock the steering, when the truck 10 is to be steered through the differential driving of the traction wheels 16L, 16R. I believe that this description will suffice as to the steering rotation of the steering and traction units 15L, 15R.

It is important, however, to realize that varying control of the individual traction motors 17L, 17R also will steer the truck. That control will be effected through my novel controller, indicated generally by the numeral 35 in FIGS. 1 and 2.

To describe the controller 35 of my invention, I shall refer first to FIG. 3 of the drawings. The construction I have chosen to illustrate has four individual series of spring contacts comprising four controller portions 36, 37, 38, 39, each adapted to control the operation of one of the two traction motors 17L, 17R in one direction. The controller portions 36, 37, 38, 39 are actuated individually, or in combinations of two, through means like those shown in my application Serial No. 27,589. Thus, there is a single manually operated handle 40 which is mounted for universal pivoting, as through a spherical end portion 41. Engaged about a lower surface on end portion 41 is a series of four controller rods 42, each adapted to be depressed against the pressure of a spring 43. When the handle 40 is pivoted, its end portion 41 will tilt, thereby depressing one or two controller rods 42, depending upon the direction in which handle 40 is moved. It will be appreciated that the particular rod or rods 42 that are depressed, and the amount of their movement, will depend upon the amplitude as well as the direction of the handle movement. The controller rods 42 are so arranged that the depression of each rod will actuate a corresponding one of the controller portions 36, 37, 38, 39, by moving its spring contacts successively into engagement with one another. Thereby the truck driver will be able, through control of the universal handle 40, to actuate one or two of the controller portions 36, 37, 38, 39, and to vary their individual operation whether one or two of those portions are actuated.

In order that the circuits of my novel controller may be more easily understood, I shall first describe the particular sequence of the spring contacts in each controller portion 36, 37, 38, 39. Referring to the controller portion 36 in FIG. 3, I indicate by the numeral 36–1 the contact that will be moved first by depression of its corresponding controller rod 42. As will appear in due course, contact 36–1 actually will predetermine a control circuit for exciting the traction motor 15L to operate in first speed in forward direction. However, to facilitate my description here, I shall merely refer to contact 36–1 as a first speed contact.

The next contact 36–D, with which contact 36–1 engages, I term a dead contact, and does not form a part of any particular control circuit. Instead, dead contact 36–D is connected in common, as through a line 45, with dead contacts 37–D, 38–D, 39–D on the corresponding controller portions.

The next following contact 36–L is a live contact which is connected through a line 46 to power line 47. Following live contact 36–L in sequence are a second speed contact 36–2 and a third speed contact 36–3.

As indicated by the numerals used in FIG. 3 and also in FIG. 4, the contact sequence of each controller portion 37, 38, 39 is like that of the portion 36, with corresponding contact series 37–1, 37–D, 37–L, 37–2, 37–3; 38–1, 38–D, 38–L, 38–2, 38–3; and 39–1, 39–D, 39–L, 39–2, 39–3.

As I have already stated, the contacts of each individual series will be moved successively into contact with one another by their corresponding controller rod 42. Thus, for example, first speed contact 36–1 will first move against dead contact 36–D, and then will move dead contact 36–D against live contact 36–L. Thereby contact 36–1 will close a first speed circuit. Further movement of contact 36–1 will effect engagement of contacts 36–2 and 36–3 in sequence, offering control of second and third speed circuits. In that way, each controller portion 36, 37, 38, 39 can be individually actuated to effect speed control. In other words, each controller portion or series of contacts can act as an individual unit, in a more or less conventional way. I shall now explain the manner in which my novel controller will act when two of the controller portions 36, 37, 38, 39 are actuated.

Let us assume that the truck driver wishes to excite the two first speed circuits that are controlled through the two controller portions 36 and 37, FIGS. 3 and 4. Naturally, he will do that by so moving handle 40 as to depress the particular rods 42 that will move both first speed contacts 36–1, 37–1. Those contacts 36–1, 37–1 will first engage the corresponding dead contacts 36–D, 37–D. That will condition the controller to close the appropriate first speed circuits, but will not actually excite those circuits.

It will be recognized that both of the actuated first speed contacts 36–1, 37–1 now are connected in common, through contacts 36–D, 37–D and line 45. Therefore, should one of the live contacts 36–L or 37–L be engaged before the other, that one live contact nevertheless will excite first speed circuits simultaneously through both of the actuated first speed contacts 36–1, 37–1.

It is important to realize that the operation I have described will enable the truck driver to excite both traction motors 17L, 17R at precisely the same time, when that is the operation he intends. Thus, when the driver wishes to move the truck forwardly or rearwardly in the direction of its axis, he can steer the truck positively so as to effect the proper movement. In other words, there will be no erratic movement of the truck, such as might be due to a slight inaccuracy in the controller, or a failure to move the controller handle in exactly the proper direction.

Of course, my controller is adapted to close circuits simultaneously when other combinations of two controller portions 36, 37, 38, 39 are actuated. Therefore, the truck driver can easily effect simultaneous excitation of the motors 17L, 17R, whether the truck is to be driven in the direction of its axis, or is to be pivoted through the rotation of the traction wheels 15L, 15R in opposed directions.

I wish to emphasize the fact that my novel controller, while particularly adapted to excite both traction motors simultaneously, still allows the truck driver full individual control of each motor. Thus, by moving the handle 40 in appropriate directions, as described in my application Serial No. 27,589 the driver can vary the speed circuits that are closed by any one of the controller portions 36, 37, 38, 39. He also can differentiate the speed circuits closed by two of those portions, when he so desires.

Those persons skilled in the art will be very well able to arrange motor control circuits that can be used with my novel controller. However, I show in FIG. 4 a circuit diagram that I prefer to utilize. Thus, I indicate diagrammatically the four controller rods 42, each in position for actuating one of the contact series 36, 37, 38, 39. I show the motor 17L including a series field 50 and armature 51 adapted to be connected across power lines 47, 47a. There is a forward drive contactor 52 having contacts 53 that are normally closed to connect one side of armature 51 to the line 47a. Contactor 52 also has a coil 54 that will be effective when energized to open contacts 53 and close a pair of contacts 55, so as to disconnect the particular side of armature 51 from line 47a and to connect it to line 47. There also is a rearward drive contactor 56 including contacts 57 and 58 and a coil 59 that are like those of contactor 52, but that control the opposite side of armature 51. The arrangement is such that contactor 52 when actuated will place armature 51 in forward drive series relation to field 50, while contactor 56 is adapted to place armature 51 in reverse series relation to field 50.

Also in series with armature 51 and field 50 are two resistor sections 60, 61. When either forward or reverse contactor 52 or 56 is actuated, the resistance of sections 60, 61 will cause motor 17L to operate in first speed. Resistor section 60 can be cut out of the motor circuit by a contactor 62 having contacts 63 and an actuating coil 64, thus placing the motor 17L in second speed. There also is a contactor 65 having contacts 66 and a coil 67 that may cut out the resistor section 61 in addition to section 60, so as to place the motor 17L in third speed.

All of the contactor coils 54, 59, 64, 67 are connected through a line 68 to power line 47a, and through appropriate lines to the contacts of my controller. Thus, because I use the controller portion 36 to control the operation of motor 17L in a forward direction, it will be readily understood that the coil 54 of forward contactor 52 is connected through a line 69 to first speed contact 36–1. Rearward drive of motor 17L will be controlled through controller portion 38, and therefore the rearward contactor coil 59 is connected through line 70 to first speed contact 38–1 of portion 38. Second speed contactor coil 64 is connected through lines 71, 72 to corresponding second speed contacts 36–2 and 38–2, while third speed coil 67 is similarly connected through lines 73, 74 to contacts 36–3, 38–3.

Thereby it will be appreciated that the controller portion 36 will control forward driving of motor 17L in three speeds, while controller portions 38 will control rearward driving of motor 17L, also in three speeds. Of course, more speeds can be provided, should that be desired, merely by adding further resistors and contactors, with corresponding contacts on the controller.

I believe it will be unnecessary to encumber my description with the details of the motor 17R and its control circuits, since those details are like those I have just described in connection with motor 17L. It will be sufficient merely to indicate that controller portion 37 will control forward operation of motor 17R, while portion 39 will control rearward operation of that motor.

It is important to realize that, in my invention, each first speed controller contact 36–1, 37–1, 38–1, 39–1 will first move against a corresponding dead contact 36–D, 37–D, 38–D, or 39–D. Thus, for example, when the truck driver moves the controller handle to excite both motors for operation in a forward direction, he will cause both first speed contacts 36–1, 37–1 to engage the dead contacts 36–D, 37–D. Thereby both first speed contacts 36–1, 37–1 are connected in common through the common line 45. Thereafter, merely one of the live contacts 36–L, 37–L is all that need be engaged for energizing both first speed contacts 36–1, 37–1. That will enable both of those contacts 36–1, 37–1 to be energized simultaneously, even though both dead contacts 36–D, 37–D may not engage the live contacts at precisely the same instant.

Since all of the dead contacts are connected in common, my invention also will operate when the motors 17L, 17R are to be operated in opposed directions. Thus, for example, should the truck driver actuate the controller portions 37 and 38 to operate motor 17L rearwardly and motor 17R forwardly, the action of dead contacts 37–D, 38–D will cause both motors to be excited simultaneously, in the opposed directions.

I believe that those persons skilled in the art will now appreciate the very considerable contribution of my invention. Through my invention, it is possible to achieve better steering control of an industrial truck that utilizes two traction motors for steering. That is because my novel controller makes it possible to excite both motors at precisely the same instant, enabling the driver to prevent an erratic movement of the truck. Moreover, my controller can do this while still allowing the driver full and independent control of the speed and direction of each individual traction motor. Therefore, I believe that the merits of my invention will be fully appreciated.

I now claim:

1. In a truck of the class having a pair of motorized steering and traction units each equipped with a traction motor and a traction wheel driven by the motor, and a controller equipped with a universal handle which, when moved to the right or left from a central position, excites opposed directional circuits for both said motors, and which when moved forwardly excites forward directional circuits for both motors and when moved rearwardly excites rearward directional circuits for both motors, that improvement for ensuring simultaneous excitation of both of the motor circuits for forward directional motion when said universally movable handle is moved substantially forwardly, comprising a first contact actuated by the handle for each forward directional motor circuit, a second contact for each forward directional circuit against which its first contact is moved when actuated by said universal controller handle, means electrically connecting said second contacts, and a third contact for each forward directional circuit connected to a source of power and against which each second contact is moved by continued forward motion of said universal handle, whereby the engagement of but one second contact of one forward circuit with its third contact will actuate both motors in the event the first and second contacts of both forward circuits have been brought into engagement by said universal handle.

2. In a truck of the class having a pair of motorized steering and traction units each equipped with a traction motor and a traction wheel driven by the motor, and a controller equipped with a universal handle which, when moved to the right or left from a central position, excites opposed directional circuits for both said motors, and which when moved forwardly excites forward directional circuits for both motors and when moved rearwardly excites rearward directional circuits for both motors, that improvement for ensuring simultaneous excitation of the appropriate directional circuits when said universally movable handle is moved substantially forwardly, rearwardly, or to the right or left, comprising a first contact actuated by the handle for each of the directional motor circuits, a second contact for each of said circuits against which its first contact is moved when actuated by said universal controller handle, means electrically connecting said second contacts, and a third contact for each of said circuits connected to a source of power and against which each second contact is moved by continued motion of said universal handle, whereby the engagement of but one second contact of one circuit with its third contact will actuate both motors in the event the first and second contacts of said one circuit and of another of the circuits have been brought into engagement by said universal handle.

3. In a truck of the class having a pair of motorized steering and traction units each equipped with a traction motor and a traction wheel driven by the motor, and a controller equipped with a universal handle which, when moved to the right or left from a central position, excites opposed directional circuits for both said motors, and which when moved forwardly excites forward directional circuits for both motors and when moved rearwardly excites rearward directional circuits for both motors, that improvement for ensuring simultaneous excitation of both of the motor circuits for forward directional motion when said universally movable handle is moved substantially forwardly, comprising a pair of contacts engaged with each other by the handle for each forward directional motor circuit, means electrically connecting to each other one contact of each of said pairs of contacts, and a third contact for each forward directional circuit connected to a source of power and against which each of said pairs of contacts is moved by continued forward motion of said universal handle, whereby the engagement of but one of said pairs of contacts of one forward circuit with its third contact will actuate both motors in the event the contacts of each pair for the forward circuits have been brought into engagement by said universal handle.

4. In a truck of the class having a pair of motorized steering and traction units each equipped with a traction motor and a traction wheel driven by the motor, and a controller equipped with a universal handle which, when moved to the right or left from a central position, excites opposed directional circuits for both said motors, and which when moved forwardly excites forward directional circuits for both motors and when moved rearwardly excites rearward directional circuits for both motors, there being speed circuits for the motors excited through further forward, rearwardly, right or left movements of the handle, that improvement for ensuring simultaneous excitation of both of the motor circuits for forward directional motion when said universally movable handle is moved substantially forwardly, comprising a first contact actuated by the handle for each forward directional motor circuit, a dead contact for each forward directional circuit against which its first contact is moved when actuated by said universal controller handle, means electrically connecting said dead contacts, a live contact for each forward directional circuit connected to a source of power and against which each dead contact is moved by continued forward motion of said universal handle, whereby the engagement of but one dead contact of one forward circuit with its live contact will actuate both motors in the event the first and dead contacts of both forward circuits have been brought into engagement by said universal handle, and a sequential speed contact against which each live contact is moved by a further continued forward motion of the handle so as to excite a speed circuit for each motor.

References Cited in the file of this patent
UNITED STATES PATENTS

| | | |
|---|---|---|
| 2,565,293 | Aydelott et al. | Aug. 21, 1951 |
| 2,586,273 | Steven | Feb. 19, 1952 |
| 2,732,022 | Lapsley et al. | Jan. 24, 1956 |